(12) United States Patent
Miles et al.

(10) Patent No.: US 8,806,529 B2
(45) Date of Patent: Aug. 12, 2014

(54) VARIABILITY IN AVAILABLE LEVELS OF QUALITY OF ENCODED CONTENT

(75) Inventors: Wilfred Jaime Miles, Arvada, CO (US); James S. Manchester, New York, NY (US)

(73) Assignee: Time Warner Cable Enterprises LLC, New York, NY (US)

( * ) Notice: Subject to any disclaimer, the term of this patent is extended or adjusted under 35 U.S.C. 154(b) by 46 days.

(21) Appl. No.: 13/441,355

(22) Filed: Apr. 6, 2012

(65) Prior Publication Data
US 2013/0268961 A1 Oct. 10, 2013

(51) Int. Cl.
*H04N 7/10* (2006.01)
*H04N 7/025* (2006.01)

(52) U.S. Cl.
USPC .......................................................... 725/32

(58) Field of Classification Search
None
See application file for complete search history.

(56) References Cited

U.S. PATENT DOCUMENTS

| | | | | |
|---|---|---|---|---|
| 6,378,129 B1* | 4/2002 | Zetts | | 725/94 |
| 6,532,593 B1* | 3/2003 | Moroney | | 725/142 |
| 6,536,043 B1* | 3/2003 | Guedalia | | 725/90 |
| 6,671,454 B1* | 12/2003 | Kaneko et al. | | 386/291 |
| 6,704,930 B1* | 3/2004 | Eldering et al. | | 725/36 |
| 6,999,432 B2* | 2/2006 | Zhang et al. | | 370/328 |
| 7,027,655 B2* | 4/2006 | Keeney et al. | | 382/239 |
| 7,089,309 B2* | 8/2006 | Ramaley et al. | | 709/226 |
| 7,269,836 B2* | 9/2007 | Nogima et al. | | 725/32 |
| 7,277,870 B2* | 10/2007 | Mourad et al. | | 705/51 |
| 7,363,096 B2* | 4/2008 | Wiser et al. | | 700/94 |
| 7,450,647 B2* | 11/2008 | Hamilton | | 375/240.26 |
| 7,607,154 B2* | 10/2009 | Morello | | 725/63 |
| 7,614,066 B2* | 11/2009 | Urdang et al. | | 725/34 |
| 7,707,485 B2* | 4/2010 | Laksono | | 715/201 |
| 7,802,286 B2* | 9/2010 | Brooks et al. | | 725/96 |
| 7,979,885 B2* | 7/2011 | Bar | | 725/119 |
| 7,995,903 B2* | 8/2011 | Kato et al. | | 386/328 |
| 8,065,498 B2* | 11/2011 | Ito et al. | | 711/162 |
| 8,392,595 B2* | 3/2013 | Babonneau et al. | | 709/231 |
| 8,473,992 B2* | 6/2013 | Nakano | | 725/96 |
| 8,578,430 B2* | 11/2013 | Beyabani | | 725/90 |
| 8,613,013 B2* | 12/2013 | Connery et al. | | 725/32 |
| 2002/0107973 A1* | 8/2002 | Lennon et al. | | 709/231 |
| 2002/0170053 A1* | 11/2002 | Peterka et al. | | 725/31 |
| 2003/0023987 A1* | 1/2003 | Hiramoto et al. | | 725/141 |
| 2003/0033601 A1* | 2/2003 | Sakata et al. | | 725/29 |
| 2003/0046704 A1* | 3/2003 | Laksono et al. | | 725/96 |
| 2003/0061619 A1* | 3/2003 | Giammaressi | | 725/95 |
| 2003/0229902 A1* | 12/2003 | Moni | | 725/95 |
| 2005/0155075 A1* | 7/2005 | Crichton | | 725/105 |
| 2005/0193420 A1* | 9/2005 | Hocevar et al. | | 725/80 |
| 2006/0115241 A1* | 6/2006 | Saigo et al. | | 386/124 |
| 2006/0288397 A1* | 12/2006 | Uchida et al. | | 725/115 |

(Continued)

*Primary Examiner* — Brian T Pendleton
*Assistant Examiner* — Jonathan V Lewis
(74) *Attorney, Agent, or Firm* — Chapin IP Law, LLC

(57) ABSTRACT

A server resource provides notification to subscribers in a respective network environment that the content is available for retrieval at a particular bit rate (e.g., a promotional bit rate) or particular level of quality (e.g., promotional level of quality) amongst multiple levels of quality for a limited duration of time. For example, an especially high level of quality (or bit rate) of the content may be available only for the limited duration of time. After making the especially high level of quality of content available for retrieval during a promotional period, the content may be subsequently available for retrieval only at lower levels of quality. Accordingly, one or more configurations as discussed herein include changing the ability to access content encoded at different levels of quality over time.

46 Claims, 12 Drawing Sheets

(56) References Cited

U.S. PATENT DOCUMENTS

| | | |
|---|---|---|
| 2007/0113261 A1* | 5/2007 | Roman et al. .................. 725/134 |
| 2007/0204285 A1* | 8/2007 | Louw .............................. 725/14 |
| 2008/0115161 A1* | 5/2008 | Kurzion ......................... 725/32 |
| 2009/0049489 A1* | 2/2009 | Kure .............................. 725/93 |
| 2009/0138932 A1* | 5/2009 | Bauchot et al. ............... 725/116 |
| 2009/0187939 A1* | 7/2009 | Lajoie ............................ 725/34 |
| 2009/0228934 A1* | 9/2009 | Luu et al. ....................... 725/64 |
| 2009/0320081 A1* | 12/2009 | Chui et al. ..................... 725/93 |
| 2010/0057782 A1* | 3/2010 | McGowan et al. ......... 707/104.1 |
| 2011/0067082 A1* | 3/2011 | Walker .......................... 725/114 |
| 2011/0072451 A1* | 3/2011 | Unger ............................. 725/23 |
| 2011/0173304 A1* | 7/2011 | Schlack et al. ................ 709/220 |
| 2011/0289542 A1* | 11/2011 | Kitazato et al. ............... 725/115 |
| 2012/0084803 A1* | 4/2012 | Johansson et al. ............. 725/25 |
| 2012/0101952 A1* | 4/2012 | Raleigh et al. ................ 705/304 |
| 2012/0330738 A1* | 12/2012 | Harlow et al. ............. 705/14.23 |
| 2013/0042276 A1* | 2/2013 | Payette et al. .................. 725/62 |
| 2013/0055332 A1* | 2/2013 | Nishi ............................ 725/131 |

\* cited by examiner

| | MONDAY | TUESDAY | WEDNESDAY | |
|---|---|---|---|---|
| CONTENT 110-1: AVAILABLE LEVELS OF QUALITY | ABR3- ABR10 | PROMOTION * ABR1- ABR10 | ABR3- ABR10 | ... |
| CONTENT 110-2: AVAILABLE LEVELS OF QUALITY | PROMOTION * ABR1- ABR10 | ... | ABR3- ABR10 | ... |

CONTENT SCHEDULE INFORMATION 125

* LIMITED AVAILABILITY

DISPLAY SCREEN 130

FIG. 3

FOR CONTENT 110-1:

| ADAPTIVE BIT RATE | | HORIZONTAL PIXEL COUNT | VERTICAL PIXEL COUNT | FRAME RATE UPDATE PER SECOND | PROFILE INFO | AUDIO BIT RATE (kbps) | VIDEO BIT RATE (Mbps) | TRANSPORT RATE (Mbps) | NETWORK ADDRESS |
|---|---|---|---|---|---|---|---|---|---|
| ABR1 | A | 1920 | 1080 | 30 | High, 4.1 | 96 | 6.22 | 6.32 | URL #1 |
| ABR2 | B | 1920 | 1080 | 30 | High, 4.1 | 96 | 4.98 | 5.07 | URL #2 |
| ABR3 | C | 1280 | 720 | 30 | Main, 3.1 | 96 | 4.42 | 4.52 | URL #3 |
| ABR4 | D | 1280 | 720 | 30 | Main, 3.1 | 96 | 3.32 | 3.41 | URL #4 |
| ABR5 | E | 1280 | 720 | 30 | Main, 3.1 | 96 | 2.76 | 2.86 | URL #5 |
| ABR6 | F | 960 | 540 | 30 | Main, 3.1 | 96 | 2.18 | 2.27 | URL #6 |
| ABR7 | G | 720 | 404 | 30 | Main, 3.0 | 96 | 1.57 | 1.67 | URL #7 |
| ABR8 | H | 640 | 360 | 30 | Main, 3.0 | 96 | 1.11 | 1.20 | URL #8 |
| ABR9 | I | 480 | 272 | 30 | Baseline | 96 | 0.98 | 1.08 | URL #9 |
| ABR10 | J | 320 | 180 | 30 | Baseline | 96 | 0.60 | 0.70 | URL #10 |

CONTENT ACCESS INFORMATION 122-1

GROUP OF DATA

FIG. 4

VARIABILITY IN AVAILABLE LEVELS OF QUALITY OF ENCODED CONTENT

BACKGROUND

Conventional adaptive bit rate (ABR) technology can be used to transmit audio and/or video streams to a decoder device. As a simple example, a network environment can include a server, a communication link, and a client. The client can include the decoder. During operation, as its name suggests, the decoder decodes a received data stream from the server and initiates playback of respective content on a playback device.

In accordance with adaptive bit rate technology, the bit rate of transmitting data to the decoder adapts (such as every few seconds) depending on available network bandwidth or other resource bottleneck. As an example, the communication link over which a data stream is transmitted to the decoder (at the client) may experience congestion. In such an instance, the bandwidth for conveying data over the network may significantly drop.

In response to detecting a condition such as decrease in bandwidth availability, a server can be notified by the client to adaptively change a level of quality or bit rate of data transmitted on a respective link to a subscriber playing back the transmitted content. In other words, the client can request data encoded at a lower bit rate or level of quality in response to detecting network congestion.

Transmitting the data at the lower bit rate or level of quality during congestion, as opposed to dropping packets transmitted to the decoder, enables the subscriber to continue playback of the content without interruption, albeit at a lower level of playback quality when congestion is detected. Adaptive bit rate technology is useful because a subscriber typically would like to playback streaming content without pauses, even though a media player must occasionally playback content at lower levels of quality.

In accordance with further conventional systems, as mentioned above, a server can be configured to support transmission of content encoded at different levels of quality to subscribers. Notably, there is a cost associated with storing the content encoded at the different levels of quality. For example, the cost of storing the content encoded at lower levels of quality is relatively low because a small amount of storage is needed to store such data. The cost for storing the content encoded at higher levels of quality can be substantially higher because more storage space is needed to store such encoded content.

BRIEF DESCRIPTION OF EMBODIMENTS

Embodiments herein deviate with respect to conventional techniques. For example, one embodiment herein is directed to distributing content encoded in one or more adaptive bit rate data streams at different levels of playback quality. The availability of the content encoded at the different levels of quality varies over time.

More specifically, in accordance with one embodiment, a processing resource partitions content into segments. A repository stores the content as multiple streams of data; each of the multiple streams of data can be encoded in accordance with a different bit rate (and/or level of playback quality). For example, a first stream of data of the multiple streams includes segments of the content encoded at a first level of playback quality; a second stream of data of the multiple streams includes segments of the content encoded at a second level of playback quality; and so on.

In one embodiment, a server (or other suitable resource) provides notification to subscribers in a respective network environment that the content (and segments) is available for retrieval at a particular bit rate (e.g., highest bit rate) or particular level of quality (e.g., highest level of quality) of multiple levels of quality for a limited duration of time. For example, an especially high level or superior level of quality (or bit rate) of the content such as a particular movie, concert, etc., may be available only during a particular time frame as during a promotion. After making the especially high level of quality of content available for retrieval in the time frame, the content may be subsequently available for retrieval only at lower levels of quality. Accordingly, one embodiment herein includes providing access to different levels of quality of encoded content over time.

In accordance with further embodiments, providing the notification of the availability of the content encoded at different levels of quality can include providing notification to one or more subscribers in the network environment that retrieval of the content at certain adaptive bit rates is limited.

Access to each respective level of quality of the content can be fee-based or non-fee based. For example, access to the portions of data at one or more particular levels of quality (or higher) may require a subscriber to pay a fee. Access to the lower levels of quality of encoded content may not require the fee required to receive the content at the higher levels of quality.

In one embodiment, for subscribers paying the fee, a server distributes the content in an adaptive bit rate data stream including segments of encoded content requiring a fee with segments of encoded content not requiring a fee.

In accordance with further embodiments as discussed herein, one or more server resources can be configured to distribute portions of the multiple streams of data in one or more adaptive bit rate data streams to subscribers in a network environment. For example, segments of the content at a first level of quality can be interleaved with segments of the content encoded according to the second level of quality, third level of quality, fourth level of quality, etc., in an adaptive bit rate data stream to a subscriber during the promotional period.

The server can be configured to switch between transmitting the segments of encoded content at the first level of quality and the second level of quality (and potentially other levels of quality) depending on available bandwidth or other resource bottleneck in a network environment. As an example, if a sufficiently large amount of bandwidth is available in the network, the server transmits segments of content encoded at a available higher level of quality. On the other hand, if there is insufficient bandwidth to transmit the content encoded at the first level of quality, which requires more bandwidth, then the server transmits the encoded content at an available lower level of quality instead. Thus, the server interleaves different levels of quality of encoded content depending on available bandwidth.

Subsequent to a promotional period ending, the server prevents distribution of the segments of content encoded at one or more higher levels of quality in adaptive bit rate data streams to subscribers, even though segments of content at the lower level of quality may still be available for retrieval by the subscribers. For example, subsequent to the promotional period, the server creates one or more adaptive bit rate data streams to subscribers using the content encoded at only the lower levels of quality beneath the highest level of quality because the highest level of quality (and/or higher levels of quality) of content is no longer available. Accordingly, embodiments herein can include preventing distribution of the portions of the content at a particular bit rate in a network environment subsequent to expiration of the promotional per or limited time duration.

The time during which the segments of content are available at a particular level of quality or bit rate can expire or terminate in a number of different ways. For example, in one embodiment, a promotional period can expire at a pre-scheduled date and time. Thus, the especially high level of quality and/or the higher levels of quality of the content can be made available for retrieval in an adaptive bit rate data stream only in a scheduled time frame.

In accordance with other embodiments, one or more higher levels of quality can be made available for retrieval. Access to the higher levels of quality can expire in response to detecting a trigger condition such as that a threshold number of subscribers retrieve the content in accordance with the highest level of quality.

In accordance with further embodiments, the server resource can detect switchover from a first distribution mode to a second distribution mode, the first distribution mode enables distribution of the content at the multiple different levels of playback quality including one or more particular levels of playback quality, the second distribution mode enables distribution of the content in accordance with multiple levels of playback quality other than at the one or more particular levels of playback quality.

By further way of a non-limiting example, each of the streams of segments of content encoded at different levels of quality can be served from different network addresses. For example, from a first network address, a server system (e.g., one or more servers such as a server resource) distributes portions of the content in the network environment as a first stream of data encoded in accordance with a first level of playback quality; from a second network address, the server system distributes portions of the content in the network environment as a second stream of data encoded in accordance with a second level of playback quality, the second level of quality higher than the first level of playback quality; from a third network address, the server resource distributes portions of the content in the network environment as a third stream of data encoded in accordance with a third level of playback quality, the third level of quality higher than the second level of playback quality; and so on.

Creation of the adaptive bit rate data stream can include retrieval of segments of encoded content from the different network addresses and interleaving such encoded segments to a produce an adaptive bit rate data stream transmitted to a subscriber.

Further embodiments herein can include producing different sets of content access information (a so-called manifest) forwarded to one or more clients in a network environment. A first set of content access information indicates resources from which to retrieve portions of the content that are available for retrieval at the different levels of quality during a respective promotion. A server distributes the first content access information to the subscribers in the network environment to notify the clients of the different network addresses in which to retrieve the content encoded at different levels of quality. The first content access information can include information indicating how to retrieve content encoded at all different levels of quality including one or more promotional highest levels of quality. Subsequent to expiration of the promotion, a second set of content access information indicates resources from which to retrieve portions of the content that are available for retrieval at the different levels of quality during the limited time duration. A server distributes the second content access information to the subscribers in the network environment to notify the clients of the different network addresses in which to retrieve the content encoded at different levels of quality. In one embodiment, after the promotion ends, the second content access information can include information indicating how to retrieve content encoded at only the standard levels of quality and not the one or more promotional higher levels of quality. The second content access information prevents access to the content encoded at the higher levels of quality after the promotion ends.

In accordance with further embodiments, the server system can be configured to generate the adaptive bit rate data streams to include advertisements. The advertisements can be targeted to subscribers depending on a location of the subscribers playing back the respective content. In one example embodiment, subscribers can pay a fee to eliminate the playback of advertisement information when playing back an adaptive bit rate data stream on a playback device. As an example, advertisements and/or advertisement markers can be removed from a respective adaptive bit rate data stream transmitted to a decoder to prevent the decoder from having to retrieve and insert advertisements into a rendition of content being played back on a media player.

As further described herein, a server and/or client can control the bit rate of transmitting or receiving data. For example, in one embodiment, a server resource monitors availability of bandwidth on a communication link and controls which adaptive bit rate segments of content are transmitted to the client. In an alternative embodiment, the client can receive a so-called manifest indicating one or more resources from which to retrieve segments of content at the different bit rates. In this latter embodiment, the client communicates with the one or more resources as specified by the manifest to retrieve segments of the content at a desired bit rate. Accordingly, embodiments herein include server-based ABR and client-based ABR.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate distribution of content according to one or more different levels of quality from a server. The instructions, when executed by a processor of a respective computer device, cause the processor or multiple processors of the system to: store content as multiple streams of data, each of the multiple streams of data encoded in accordance with a different bit rate to play back a rendition of the content according to a different level of quality; provide notification to subscribers in a network environment that a particular bit rate of multiple available bit rates for playing back the content is available for a limited time duration; distribute portions of the multiple streams of data in the network environment during the limited time duration; and prevent distribution of the portions of the content at the particular bit rate in the network environment subsequent to expiration of the limited time duration.

Yet another embodiments herein includes a computer readable storage medium and/or system having instructions stored thereon to distribute content from an intermediate distribution node. The instructions, when executed by a processor of a respective computer device, cause the processor or multiple processors of the system to: adaptively transmit portions of encoded content at multiple different levels of playback quality in a network environment; and subsequent to detecting occurrence of a trigger event: i) prevent transmission of the content at a particular level of playback quality of the multiple different levels of playback quality, and ii) adaptively transmit the content at the multiple levels of playback quality other than the particular level of playback quality.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of distributing different levels of quality of adaptive bit rate encoded content in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 3 is an example diagram illustrating notification of the availability of different levels of quality and how availability of the different adaptive bit rate encoded content changes over time according to embodiments herein.

FIG. 4 is an example diagram illustrating content access information indicating multiple network addresses from which to retrieve content encoded at different levels of quality according to embodiments herein.

DETAILED DESCRIPTION

According to one embodiment, a server resource provides notification to subscribers in a respective network environment that content is available for retrieval at one or more particular bit rates or one or more particular levels of quality amongst multiple levels of quality for only a limited duration of time. For example, one or more especially high levels of quality (or bit rate) of the content may be available only for the limited duration of time. After making the one or more especially high levels of quality of content available for retrieval during a promotional period, the content may be subsequently available for retrieval only at lower levels of quality. Accordingly, one or more configurations as discussed herein include changing the ability to access content encoded at different levels of quality over time.

Figure 1:
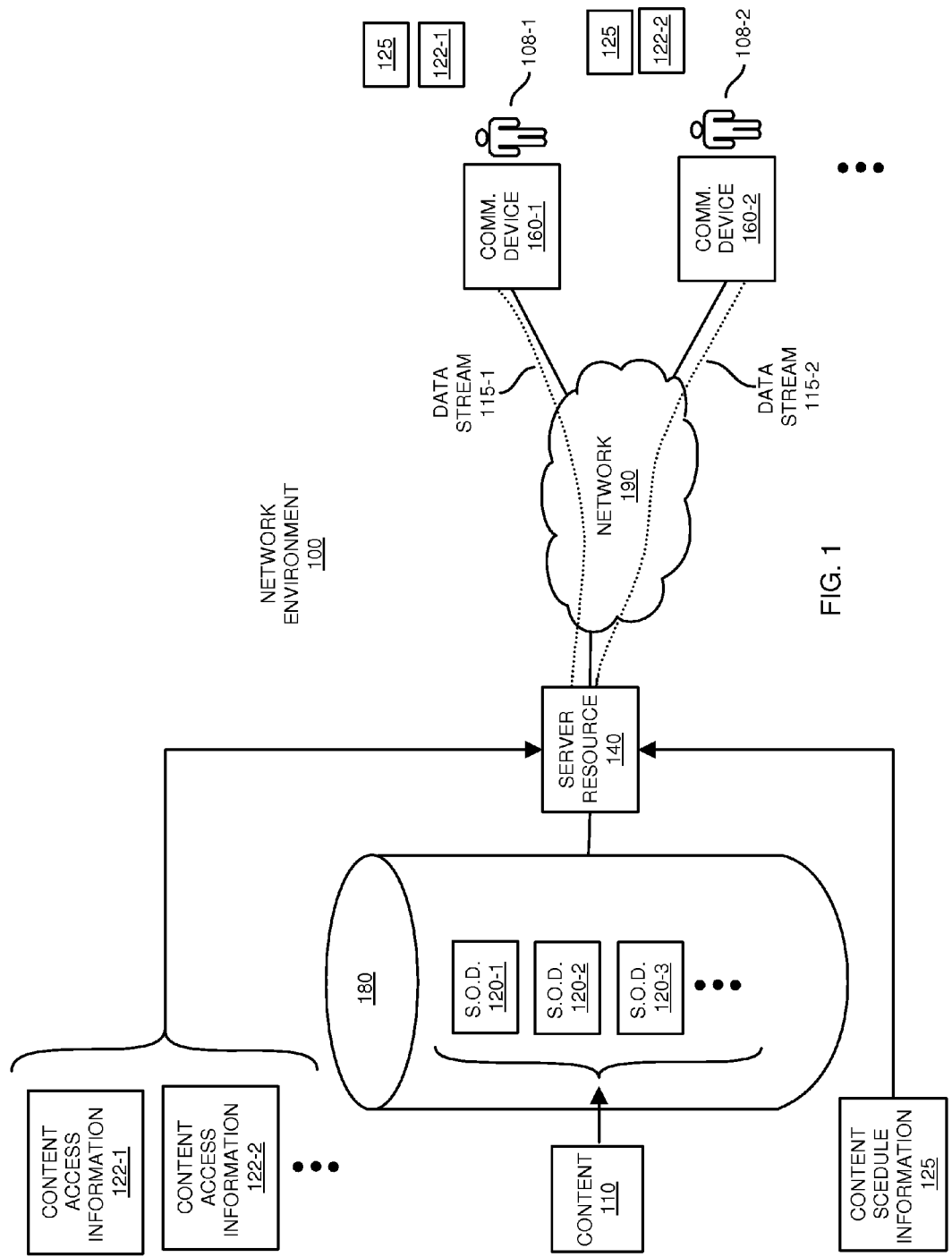
FIG. 1 is an example diagram illustrating a network environment facilitating distribution of content at different levels of quality according to embodiments herein.

More specifically, FIG. 1 is an example diagram of a network environment facilitating novel distribution of content encoded at different levels of quality according to embodiments herein.

As shown, network environment 100 includes content 110, repository 180, server resource 140 (e.g., one or more servers), network 190, and communication devices 160 operated by respective users 108 (e.g., subscribers).

In this example embodiment, the repository 180 stores streams of data 120 derived from content 110. Content 110 can be video information, audio information, etc.

In general, server resource 140 initiates distribution of the different portions of the streams of data 120 over network 190 to the communication devices 160. In one embodiment, the communication devices 160 are playback devices or include media players configured to play back a rendition of the content 110 in accordance with the different levels of quality of data received from the server resource 140.

Note that network 190 can include any suitable type of resource or data communication device supporting distribution of data from server resource 140 to each of one or more users 108 located in the network environment 100. For example, in one embodiment, network 190 includes resources such as routers, core networks, edge servers, storage resources, switches, etc., facilitating distribution of content encoded at different levels of quality according to one or more suitable Internet data transport protocols (e.g., IP protocols).

By way of a non-limiting example, network 190 can be or include a content delivery network.

In one embodiment, network 190 includes resources to cache data at respective edge nodes in proximity to the client devices (e.g., communication devices 160). Initially, a cache may be empty in which case data is retrieved from a remote source such as a server resource 140. The edge nodes in network 190 can be configured to cache certain adaptive bit rate segments transmitted through the edge node to corresponding communication devices 160. On a subsequent request, and to increase an efficiency of the network 190, instead of retrieving adaptive bit rate segments from remote server 140, the communication devices 160 can retrieve the segments of content from edge servers. As mentioned, a client can retrieve the adaptive bit rate segments of content from the server resource 140 if the content is not available in a nearby edge server.

Communication devices 160 can be any suitable type of processing device such as a personal computer, television, Apple™ products, etc., including a respective media player configured to playback media to a user.

By further way of a non-limiting example, the communication devices can be configured to request retrieval of the different segments of encoded content using any of one or more suitable IP protocols. One application of receiving data stream 115 is a video on demand type of application in which the respective users request retrieval of content over one or more communication links that support conveyance of data packets transmitted on a packet-switched network. Each client can request retrieval of the different adaptive bit rate segments of encoded content based on a suitable protocol such as the HTTP (HyperText Transport Protocol) request messages.

In such an instance, in response to the request, a respective communication device may initially request the lower levels of quality of the available adaptive bit rate content 110 to immediately play back the desired content. After sufficient buffering, a decoder in the communication device can request the segments of the content at the higher adaptive bit rates. Subsequent to startup and initial playback of the content, the decoder continuously requests the best quality of content for playback at any given time for the available resources. Accordingly, the communication device 160 can be configured to control a bit rate of receiving content.

In accordance with further embodiments, one or more of the users 108 can receive the available content over a shared cable network. In one embodiment, the subscribers (e.g., users 108) can independently make requests to retrieve segments of the content 110 at different levels of quality over an IP portion of a cable bandwidth dedicated for retrieval and viewing video on demand applications.

Alternatively, a portion of the cable bandwidth in the cable network can be dedicated to so-called linear channel programming in which the subscribers must tune their respective communication devices (e.g., set-top boxes) to a broadcast channel to receive such content. The network 190 can be or include a cable network over which the content 110 encoded at different levels of quality is broadcasted to each of multiple users in a so-called service group. In such an embodiment, the users 108 configure their respective communication devices 160 to tune to an available channel and play back selected content.

In accordance with further embodiments, note that if the demand for the IP bandwidth portion of the cable becomes sufficiently high, the cable provider can dynamically adjust an allocation of an amount of cable bandwidth that is available for video on demand and the content that is encoded at the higher adaptive bit rates.

In general, communication devices 160 communicate over network 190 with server resource 140. As mentioned, and by way of a non-limiting example, each of the communication devices 160 can be or include any suitable type of mobile or non-mobile device such as a cellular phone device, mobile device, personal digital assistant, touch pad device, portable computer, wire-line telephone, cable set-top box, television, display screen, wireless phone, wireless mobile device, television, etc.

Network 190 can be and/or include any suitable type of network supporting communications amongst communication devices 160 and or other resources in communication system 100. For example, network 190 can be and/or include a phone network, cellular phone network, Internet, local area network, public switched telephone network, cable network, hybrid-fiber coaxial network, etc.

In accordance with one embodiment, communications over network 190 can include data packets (or groupings of data packets) that are packet-switched in accordance with one or more different Internet or web-based network routing protocols. Communications over network 190 also can be transmitted over dedicated links. The available bandwidth in which to convey content 110 encoded at the different levels of quality can vary over time.

The following textual description describes functionality supported by communication device 160-1. In general, the user 108-1 operates the communication device 160-1 to retrieve content 110 encoded at different levels of quality.

As mentioned, in accordance with one embodiment in which the client (e.g., communication device 160) controls retrieval of adaptive bit rate segments of content, the server resource 140 (e.g., one or more servers) distributes portions of the streams of data (e.g., stream of data 120-1, stream of data 120-2, stream of data 120-3, etc.) in data stream 115-1 based on input from the client. By way of a non-limiting example, the data stream 115-1 can be a so-called adaptive bit rate data stream in which the level of quality of data transmitted to the communication device 160-1 varies depending on one or more parameters such as available network bandwidth in network 190, ability of a decoder in the communication device to store and/or process the adaptive bit rate data stream, etc.

Note that the other communication devices 160 such as communication device 160-2 in network environment 100 can support similar functionality for each of different end users operating respective playback devices. In other words, the user 108-2 at communication device 160-2 can select content for retrieval. In such an instance, the server resource 140 conveys the content 110 encoded at multiple levels of quality over network 190 in data stream 115-2 to the communication device 160-2 in accordance with adaptive bit rate segments selected by the communication device 160-2. The communication device 160-2 decodes the data stream 115-2 and plays back the content 110 on a respective media player.

In accordance with one embodiment, a processing resource partitions content 110 into segments. The playback segments of content 110 can be of the same or different sizes. Further, the segments represent an amount of the content to play back up to or more than several seconds of content.

The processing resource further encodes each of the segments at different levels of quality to produce stream of data 120. Playback of the higher level of quality produces a better quality picture on a respective display screen. As mentioned, repository 180 stores the content 110 as multiple streams of data 120.

By way of a non-limiting example, each of the multiple streams of data 120 is encoded in accordance with a different bit rate (or level of playback quality). For example, stream of data 120-1 of the multiple streams 120 includes the segments of the content 110 encoded at a first level of playback quality; stream of data 120-2 of the multiple streams 120 includes the segments of the content 110 encoded at a second level of playback quality; stream of data 120-3 of the multiple streams 120 includes the segments of the content 110 encoded at a third level of playback quality; and so on.

Figure 2:
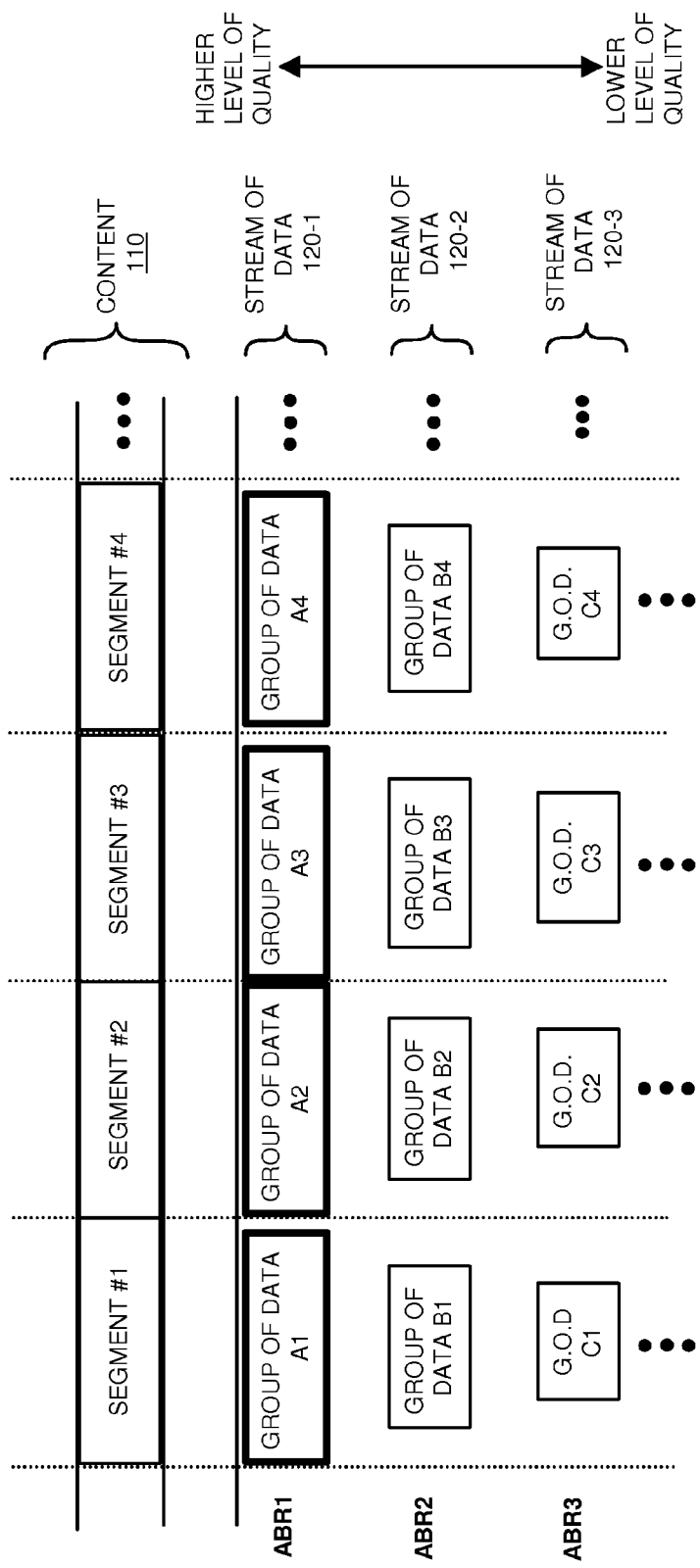
FIG. 2 is an example diagram illustrating segments of content encoded at each of multiple different levels of quality according to embodiments herein.

FIG. 2 is an example diagram illustrating content encoded at each of multiple different levels of quality according to embodiments herein.

In accordance with one embodiment, as mentioned, a processing resource derives or produces multiple streams of data 120 (e.g., stream of data 120-1, stream of data 120-2, stream of data 120-3, etc.) based on processing of content 110.

The content 110 can be any suitable data such as a video stream, audio stream, slide show, etc., that is played back by an end user 108 over time as the data is received. In one embodiment, a respective communication device 160 buffers and plays back segments of the content 110 encoded at different levels of quality as the segments are sequentially received over respective network 190.

As shown, and as mentioned, each of the multiple streams of data 120 can be encoded to enable play back of the content 110 according to a different level of quality. For example, the server resource 140 or other suitable resource converts segment #1 of the original content 110 (e.g., a portion such as up to or more than several seconds of a video) into grouping of data A1, grouping of data B1, grouping of data C1, etc. Each grouping of data can include one or more data packets.

Grouping of data A1 supports playback of segment #1 of content 110 according to a first level of quality; grouping of data B1 supports playback of segment #1 according to a second level of quality; grouping of data C1 supports playback of segment #1 according to a third level of quality; and so on. As mentioned, the amount of bits needed to encode a respective segment of the content is greater at the higher level of quality than at the lower level of quality.

Further, the processing resource converts segment #2 (e.g., a next segment following segment #1) of the content 110 (e.g., a portion such as several seconds of a video) into grouping of data A2, grouping of data B2, grouping of data C2, etc.

Grouping of data A2 supports playback of segment #2 of content 110 according to the first level of quality; grouping of data B2 supports playback of segment #2 of content 110 according to the second level of quality; grouping of data C2 supports playback of segment #2 of content 110 according to the third level of quality; and so on.

Thus, in this way, each segment of the content 110 is broken down into groupings of data at the different levels of quality for inclusion in a respective stream of data 120.

In accordance with one type of media application, each of the groupings of data indicates how to control settings of multiple display elements (e.g., pixels, picture elements, etc.) of a display screen.

In such an embodiment, each of the encoded content 110 at the different levels of quality support playback of the content 110 at a different resolution. For example, the stream of data 120-1 (e.g., highest level of quality) can support playback of content such as a movie at a resolution of 1920×1080 pixels; the stream of data 120-3 (e.g., a next lower level of quality) can support playback of the movie at a resolution of 1280× 720 pixels; and so on. Thus, lower levels of quality can support playback of lower resolution renditions of the content 110.

In one embodiment, as mentioned, the groupings of data derived from content 110 and included in respective streams of data 120 can include one or more data packets. That is, the content 110 can be packetized into multiple streams of data 230 to facilitate distribution over the network 190.

The groupings of data can include appropriate metadata (e.g., routing information, security information, etc.) facilitating transmission (e.g., packet-switched routing) of the content encoded at different levels of quality over the network 190 to one or more different end users 108. The metadata included in a respective data stream 115 or included in the groupings of data can be used to facilitate orderly playback of the content 110.

Referring again to FIG. 1, server resource 140 (or other suitable resource) provides notification to subscribers 108 in a respective network environment 100 that the content 110 is available for retrieval at one or more bit rates or levels of quality. As previously mentioned, the notification to a user 108 can further indicate that content encoded at one or more levels of quality or bit rate(s) is available only for a limited duration of time.

As an example, an especially high level of quality (or bit rate) of the content 110 such as a particular movie, concert, etc., may be available only during a particular time frame such as during a promotion. After making the especially high level of quality of content 110 available for retrieval in the time frame, the content 110 may be subsequently available for retrieval only at lower levels of quality. Accordingly, one embodiment herein includes providing access to different levels of quality of encoded content 110 over time.

In accordance with further embodiments, one or more lower levels of quality of content may be made available only for a limited duration of time during a promotion. The one or more lower levels of quality may be fee-based or non-fee-based content.

In one embodiment, the server resource 140 notifies one or more subscribers 108 of the availability of the content 110 encoded at especially high levels of quality via transmission of content schedule information 125 to the subscribers 108.

FIG. 3 is an example diagram illustrating content schedule information 125 that is transmitted over network 190 for viewing by a respective user 108. As shown in FIG. 3, the user is apprised, via a notification (e.g., an advertisement, a program guide, etc.), when the exceptionally high or superior level of quality of encoded content 110 is available for retrieval.

In the non-limiting example of FIG. 3, the content schedule information 125 indicates that content 110-1 is available at all levels of quality including the higher levels of quality (e.g., adaptive bit rate 1 and adaptive bit rate 2) at a scheduled time such as on Tuesday. For Monday and Wednesday, the content schedule information 125 indicates that content 110-1 is available for retrieval only at the lower levels of quality (ABR3-ABR10).

In this non-limiting example, the content schedule information 125 further indicates that content 110-2 is available at all levels of quality including the higher levels of quality (e.g., ABR1 and ABR2) at a scheduled time such as on Monday. For Tuesday, the content schedule information 125 indicates that content 110-2 is available for retrieval only at the lower levels of quality (ABR5-ABR10). For Wednesday, the content schedule information 125 indicates that content 110-2 is available for retrieval only at the levels of quality (ABR3-ABR7).

Thus, in accordance with one embodiment, the server resource 140 provides the notification of the availability of the content 110 via content schedule information 125.

Referring again to FIG. 1, as mentioned, access to the content 110 at the different levels of quality can be fee-based or non-fee based. For example, a subscriber may be required to pay a fee to have access to the portions of content 110 encoded at one or more higher levels of quality (e.g., ABR1 and ABR2), assuming such encoded content is available for retrieval from server resource 140. The subscriber may have access to the lower levels of quality of encoded content 110 (e.g., ABR3-ABR10) without paying a respective fee or additional fee.

In one embodiment, the server resource 140 can be configured to interleave fee-based encoded content 110 (e.g., ABR1 and ABR2) with non fee-based encoded content (e.g., ABR3-ABR10) as discussed below. For example, if a user pays a fee to retrieve the higher level of quality of encoded content 110, the subscriber can be moved to a higher-class subscriber having access to the adaptive bit rates ABR1 and ABR2. As discussed herein, the client and/or server can control which segments of data to transmit to a communication device 160.

In one embodiment, whether the content 110 is fee-based or non-fee-based, or a combination of both, the server resource 140 distributes the content 110 in one or more data streams 115 (e.g., data stream 115-1, data stream 115-2, etc) to the users 108. By way of non-limiting example, one or more of the data streams 115 transmitted over network 190 can be adaptive bit rate data streams in which the server resource 140 transmits a varying level of quality of encoded content to a respective subscriber over time.

In accordance with yet further embodiments, note that content access information 122 can be configured to notify a respective user of the standard adaptive bit rates, such as ABR3-ABR10. In such an instance, for users 108 having access to the higher adaptive bit rates, such as those that pay an additional fee and are elevated to a higher class subscriber, the server resource 140 can be configured to notify the users 108 of additional ports and/or network addresses from which to retrieve the content at the higher levels of quality such as segments of the content 110 encoded at the bit rate ABR1 and ABR2 other than including such information in the content access information 122. Instead, the server resource 140 notifies the users of the additional network addresses from which to retrieve the higher level of quality via insertion of the network addresses as metadata into the data stream 115 (as a possible alternative to including the network addresses to the higher adaptive bit rates ABR1 and ABR2) in the content access information. In other words, the data stream can include metadata transmitted to the subscriber indicating that the higher adaptive bit rate data streams are available and the corresponding locations from which to retrieve such adaptive bit rate data streams.

Thus, when receiving a segment of content encoded at a rate such as ABR3, assuming the subscriber has been moved included in a higher class having access to the higher levels of quality, the metadata transmitted in the data stream 115 can indicate that a next or any subsequent segment of the content 110 encoded at the bit rate ABR1 can be retrieved from network address such as URL #1 and that bit rate ABR2 of the segments can be retrieved from network address such as URL #2. Thus, in such an embodiment, the content access information 122-1 can indicate to the communication device 160 how to retrieve the content encoded at the standard levels of quality (e.g., ABR3-ABR10); the additional network addresses (URL #1 and/or URL #2) can be inserted into the data stream 115 indicate to the decoder in the communication device 160 of the higher level of quality of segments available for subsequent segments associated with the content 110.

Assume in this example, that the user 108-1 views the content schedule information 125 on Tuesday and selects the content 110-1 for retrieval and/or viewing. In such an instance, the communication device 160-1 receives input from the user 108-1 to play back the content 110-1 at the promotional bit rates ABR1 and/or ABR2. In accordance with such an embodiment, the server resource 140 (or other suitable resource) initiates distribution of the content access information 122-1 to the communication device 160-1.

In general, content access information 122 includes information about the available content as well as information about how to retrieve the content at different levels of quality (e.g., adaptive bit rates).

Notably, the content access information 122 transmitted to the users 108 can vary from user to user as well as change from time to time depending on what content is currently available. For example, server resource 140 can generate the content schedule information 125 and/or content access information 122 based on business rules. The business rules can indicate which encoded content 110 and respective levels of quality of the encoded content 110 will be available to the different classes of users 108.

In such an embodiment, depending on settings of business rules, the server resource 140 may be configured to forward a first version of content schedule information 125 to user 108-1 and a second version of content schedule information 125 to user 108-2. Further, the server resource 140 may be configured to forward a first version of content access information 122-1 to user 108-1 in response to receiving a request to retrieve content 110-1 and a second version of the content access information 122-2 in response to receiving a request to view content 110-1 as only one of subscribers 108-1 and 108-2 may be included in a class enabling retrieval of the content at the higher levels of quality ABR1 and ABR2.

As previously discussed, the content access information enables each of the clients (e.g., communication devices 160) to generate requests to the appropriate resources to retrieve segments of content at the different adaptive bit rates suitable for the respective communication device 160.

FIG. 4 is an example diagram illustrating content access information according to embodiments.

By way of a non-limiting example, content access information 122-1 indicates the different bit rates (e.g., levels of quality) for the encoded content 110-1 that are available for retrieval by a communication device 160 as well as the different network addresses from which the content 110-1 can be retrieved.

In this example, assume that all levels of quality are available for transmission in an adaptive bit rate data stream. The content access information 122-1 indicates that the communication device 160-1 can retrieve segments of the content 110-1 encoded at the highest level of quality (e.g., ABR1) via use of a network address such as URL #1 (Uniform Resource Locator #1); the content access information 122-1 indicates that the communication device 160-1 can retrieve segments of the content 110-1 encoded at the next lower level of quality (e.g., ABR2) via use of a network address such as URL #2 (Uniform Resource Locator #2); the content access information 122-1 indicates that the communication device 160-1 can retrieve segments of the content 110-1 encoded at the next lower level of quality (e.g., ABR3) via use of a network address such as URL #3 (Uniform Resource Locator #3); and so on.

In addition to use of the network addresses to retrieve segments of the content, the communication device 160 requesting the segments of adaptive bit rate data can provide information indicating what particular numbered segment of the encoded content is to be forwarded to the decoder at a particular time.

In addition to the above information, as shown, the content access information 122 can include content identifier information indicating the content to which the content access information pertains; the content access information can further include information indicating the resolution of a respective display screen the encoded content supports; the content access information can further indicate the bit rate and/or transport rate of the encoded content; the content access information 122 can include one or more encryption keys that are to be used to decrypt the segments of encoded content retrieved form the server resource 140, and so on.

The content access information 120 can be transmitted to a respective decoder in the communication device 160 at any suitable time such as when the communication device 160 boots, upon request for retrieval of particular content, under circumstances in which the content access information changes, etc.

As mentioned, the rate of transmitting the sequence of segments in the data stream can vary depending on one or more parameters such as: the availability of bandwidth in network 190; the ability of a decoder in the communication device 160 to store and/or process the received data stream 115, etc.

In such an instance, the server resource 140 adaptively changes a rate of the encoded content that is transmitted in the respective data stream 115 to the communication device 160.

In one embodiment, a decoder device (in a respective communication device 160) that decodes the received data stream 115 monitors its available memory, available CPU time, rate of consumption of the data stream 115, etc., to make a determination of which level of quality or bit rate to retrieve subsequent segments of the encoded content 110. The communication device 160 initiates retrieval of the encoded content (e.g., segments at higher or lower adaptive bit rates) from the different network addresses depending on available bandwidth or other suitable parameter as discussed above. For example, if the availability of bandwidth or the ability of the decoder in the communication device to process the received data stream is high, the communication device 160 retrieves the higher adaptive bit rate encoded content (e.g., ABR1 and ABR2) to playback the content for a respective user. If the availability of bandwidth is low, the communication device 160 adapts to retrieving the lower adaptive bit rate encoded content (e.g., ABR2 or lower) to playback the content for a respective user.

Further embodiments herein can include producing different sets of content access information 122 forwarded to one or more clients in a network environment. A first set of content access information 122-1 indicates sources from which to retrieve portions of the content 110-1 that are available for retrieval at the different levels of quality during the limited time duration (e.g., segments encoded at the adaptive bit rate ABR1 and ABR2 are available on Tuesday). As mentioned above, the server resource 140 can be configured to distribute first content access information to the subscribers in the network environment to notify the clients of the different network addresses in which to retrieve the content encoded at different levels of quality. The first content access information can include information indicating how to retrieve content encoded at all different levels of quality including one or more promotional highest levels of quality.

Subsequent to expiration of the promotion (e.g., for availability of the content 110-1 on Wednesday after the promotion), a second set of content access information indicates resources from which to retrieve portions of the content that are available for retrieval at the different levels of quality (e.g., ABR3-ABR10) after the promotional period. Server resource 140 distributes the second content access information to the subscribers in the network environment to notify the clients of the different network addresses in which to retrieve the content encoded at different levels of quality. In one embodiment, the second content access information can include information indicating how to retrieve content encoded at only the standard levels of quality (e.g., ABR3-ABR10) and not the one or more promotional higher levels of quality (e.g., ABR1 and ABRR2). The content access information (distributed on Wednesday or Monday, as the case may be) prevents access to the content encoded at the higher levels of quality after the promotion ends.

Figure 5:
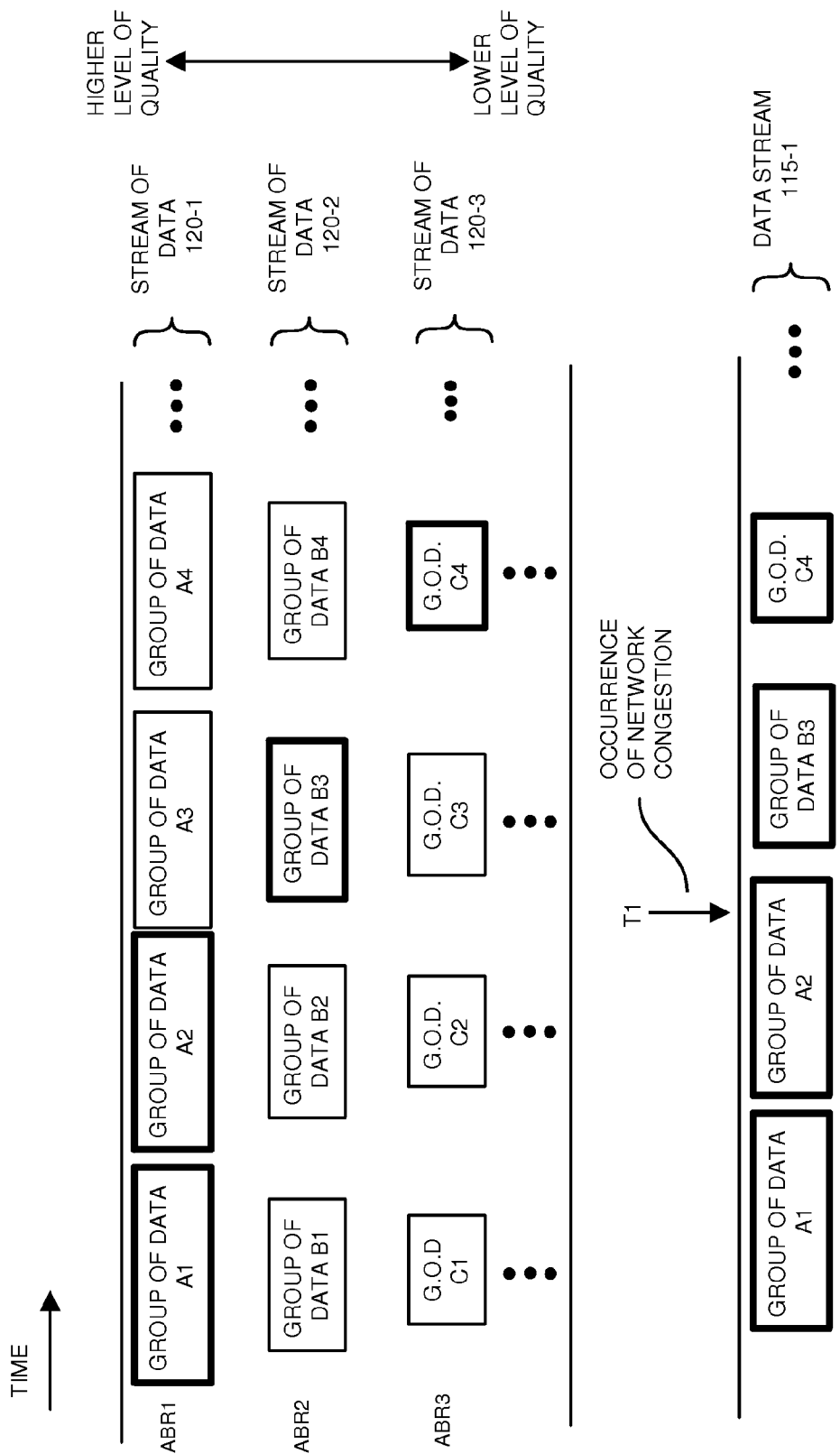
FIG. 5 is an example diagram illustrating selection of content encoded at different levels of quality to produce each of one or more adaptive bit rate data streams according to embodiments herein.

FIG. 5 is an example diagram illustrating selection and/or retrieval of content encoded at different levels of quality to produce an adaptive bit rate data stream according to embodiments herein.

As shown, the data stream 115-1 transmitted over network 190 to the communication device 160-1 includes different portions (e.g., segments) of the available streams of data 120. The server resource 140 or communication device 160 (depending on whether server-based ABR or client-based ABR is implemented) initially selects portions of encoded content from the highest level of quality stream of data 120-1 and transmits the corresponding groups of data A1 and A2 to the communication device 160-1 in data stream 115-1. To alleviate disruption of viewing a playback of the rendition of content 210, upon detecting a condition such as the occurrence of network congestion such as at time T1, the server resource 140 or communication device 160 selects an appropriate lower level of quality of encoded content to transmit on data stream 115-1 to the client.

For example, in response to detecting congestion and an inability to transmit the higher level of quality encoded content (e.g., A3, A4, . . . ) on data stream 115-1 at a desired rate for segments 3 and 4, the server resource 140 instead transmits the group of data B3 on data stream 115-1 for segment 3. Thus, if there is not enough bandwidth (as detected by the client and/or server) to transmit subsequent segments of the content encoded at the ABR2 rate, the server resource 140 or client selects a next lower level of quality (e.g., ABR3). In this instance, the server resource 140 transmits group of data C4 (e.g., segment #4) of the content encoded at the bit rate ABR3, and so on.

Accordingly, the communication device 160-1 receives the segments of encoded content 110-1 at different levels of quality depending on an ability to transmit and/or playback the encoded content received on the data stream 115-1. If more bandwidth becomes available to transmit the data stream 115-1, the server resource 140 transmits the following segments of the content at an appropriate higher level of quality.

In this way, a playback device operated by the user 108 plays back a rendition of the content 110 according to the level of quality of the groupings of data received from the server resource 140. Thus, a user 108 can view substantially continuous playback of a rendition of the content 210 according to different levels of quality, with fewer or no undesirable playback pauses. However, the user 108 may notice a change in the resolution of the rendition of content 210 being played back because of the lower level of quality of encoded content transmitted over the data stream 115.

As mentioned, one way to control which level of quality is to be included and transmitted in data stream 115-1 is to repeatedly receive control information from a respective communication device 160-1 (or decoder in the communication device) as to which level of quality to forward on the data stream 115-1. As previously discussed, the decoder in the communication device 160-1 uses the content access information 122 as a basis to retrieve the content encoded at different levels of quality from the server resource 140. For example, in response to detecting congestion and an inability to retrieve the segments of encoded content at a sufficient rate, the communication device 160-1 initiates retrieval of the segments of encoded content from a different network address that supports transmission of encoded content at one or more lower levels of quality. In response to detecting reduced congestion and an ability to retrieve the segments of encoded content at a higher rate, the communication device 160-1 retrieves the segments of encoded content from a different network address that supports transmission of encoded content at one or more higher levels of quality.

Alternatively, however, note that any suitable resource in network environment 100 can monitor the ability to transmit the segments of encoded content to a respective communication device and determine which level of quality of the encoded content that is to be transmitted to a target device playing back the content.

Subsequent to a promotional period ending, for example, on days other than Tuesday, such as Monday or Wednesday when the highest level of quality content 110-1 is not available, the server resource 140 prevents distribution of the segments of content encoded at one or more higher levels of quality (e.g., ABR1 and ABR2) in adaptive bit rate data streams to subscribers, even though segments of content at the lower level of quality may still be available for retrieval by the subscribers.

For example, prior to or subsequent to the promotional period, the server resource 140 can be configured to create and transmit one or more adaptive bit rate data streams to subscribers using the content 110-1 encoded at only the lower levels of quality beneath the highest level of quality (e.g., ABR3-ABR10) because the highest levels of quality (e.g., ABR1 and ABR2) are no longer available. Accordingly, embodiments herein can include preventing distribution of the segments of the encoded content (e.g., groupings of data) at one or more bit rates (e.g., ABR1 and ABR2) subsequent to expiration of the promotional per or limited time duration.

In accordance with further embodiments, note that the server resource 140 and/or client (e.g., communication device 160) can be configured to generate the adaptive bit rate data streams to include advertisements and/or markers indicating where to insert advertisements in the data stream being played back. The advertisements can be targeted to subscribers depending on a location of the subscribers playing back the respective content. In one embodiment, the subscribers can pay a fee to eliminate inclusion of the advertisement information in a respective adaptive bit rate data stream played back by a respective user.

Figure 6:
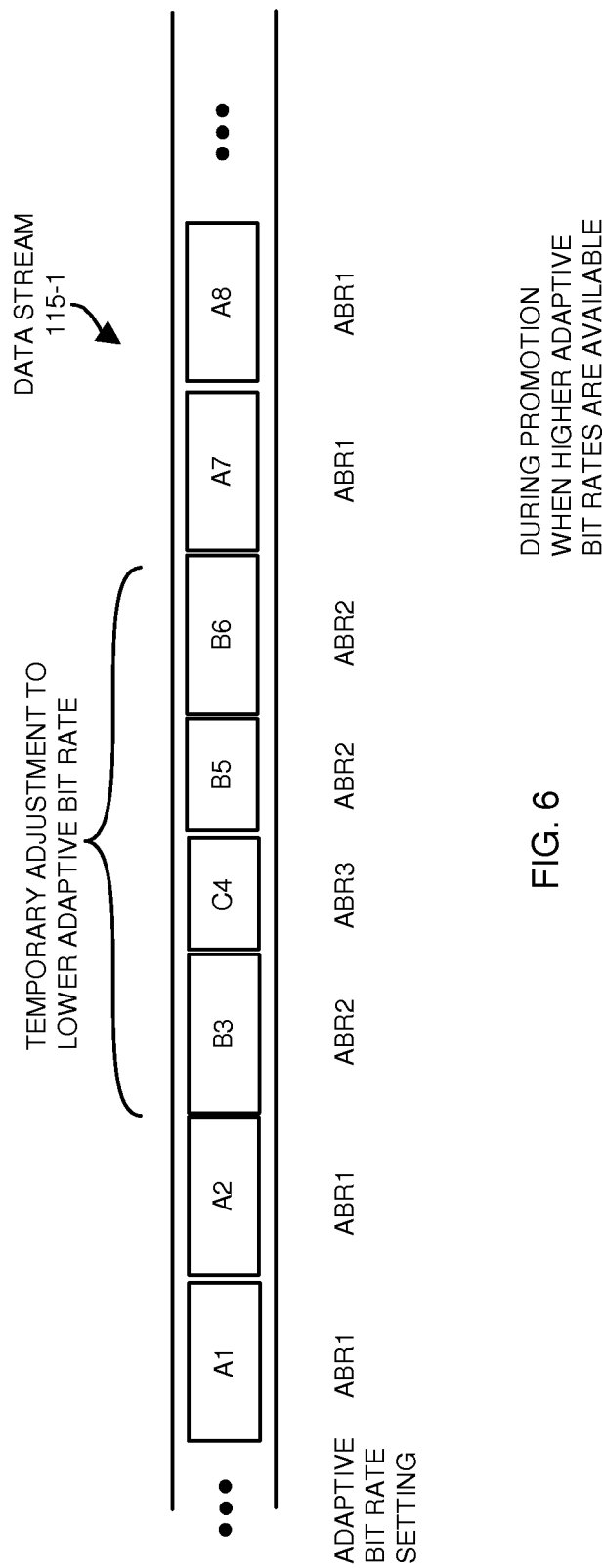
FIG. 6 is an example diagram illustrating interleaving of content encoded at different levels of quality during a promotion according to embodiments herein.

FIG. 6 is an example diagram illustrating interleaving of content encoded at different levels of quality during a promotion according to embodiments herein.

As previously discussed, the communication device 160-1 retrieves the encoded content at different levels of quality based on a parameter such as available network bandwidth, the ability of the decoder to store and/or consume the data stream, etc. In this example, the server resource 140 transmits segments of the encoded content 110-1 (e.g., segment 1, 2, 7, 8, . . . ) at the higher levels of quality during the promotional period. During a condition such as congestion, the server resource 140 transmits the content 110-1 at the lower levels of quality as shown.

Note that the bit rate of the segments of the encoded content can be any suitable value. For example, the content can be encoded up to 15 Megabits per second or even higher. Bit rates as low as 3 Megabits per second can provide playback at standard definition setting.

Figure 7:
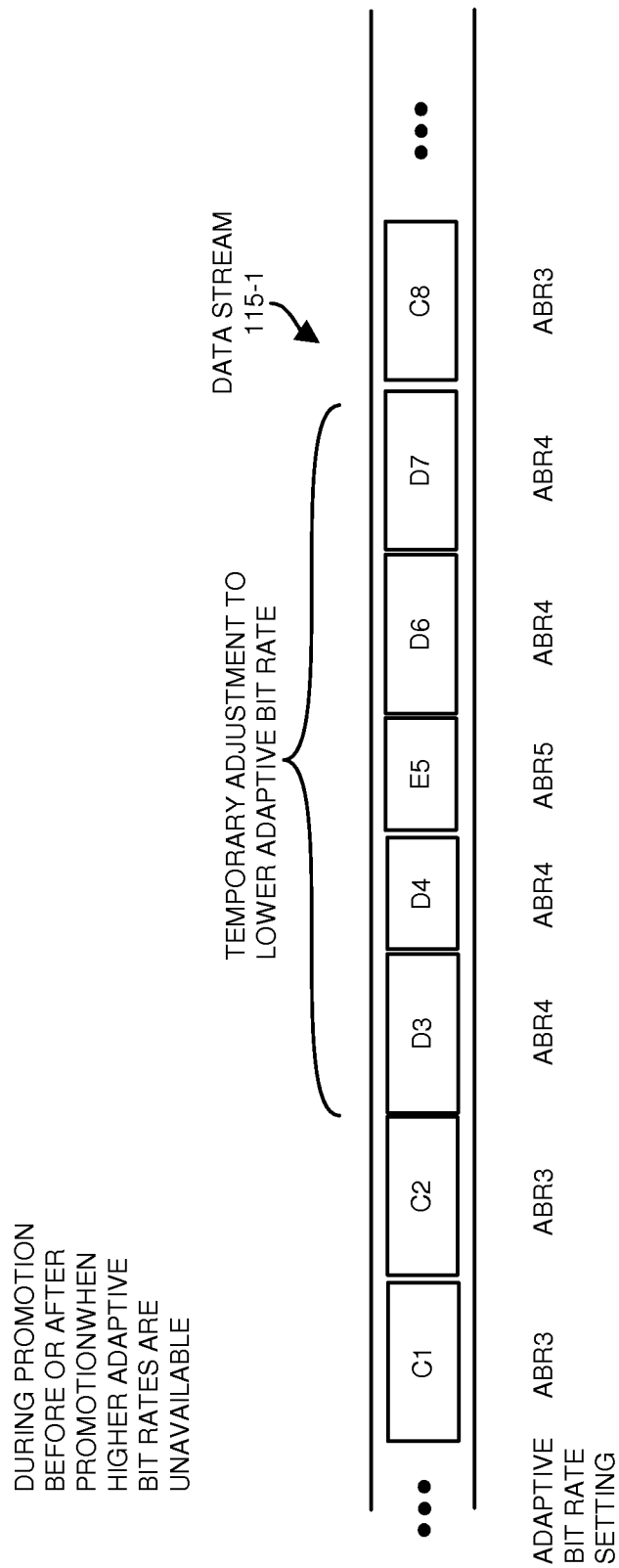
FIG. 7 is an example diagram illustrating interleaving of content encoded at different levels of quality prior to or after a promotion according to embodiments herein.

FIG. 7 is an example diagram illustrating interleaving of content encoded at different levels of quality before and/or after a promotion according to embodiments herein.

As previously discussed, the communication device 160-1 retrieves the encoded content at different levels of quality based on a parameter such as available network bandwidth, data stream consumption capability, data stream storage capability, etc. In this example, the server resource 140 transmits segments of the encoded content 110-1 (e.g., segment 1, 2, 7, 8, . . . ) at the highest levels of quality available (e.g., ABR3) during the non-promotional period. During congestion, when in the non-promotional mode, and in accordance with the client (e.g., communication device 160), the server resource 140 transmits the content 110-1 at corresponding lower levels of quality (e.g., ABR4 or lower, which are beneath a highest available level of quality ABR3) depending on bandwidth.

In view of FIGS. 6 and 7, embodiments herein include producing a first adaptive bit rate data stream including at least portions of the content at one or more higher levels of quality such as at ABR1 and ABR2. Subsequent to the promotion, embodiments herein include preventing inclusion of portions of the content encoded at the one or more levels of playback quality (e.g., ABR1 and ABR2) in a second adaptive bit rate data stream transmitted in the network environment.

Figure 8:
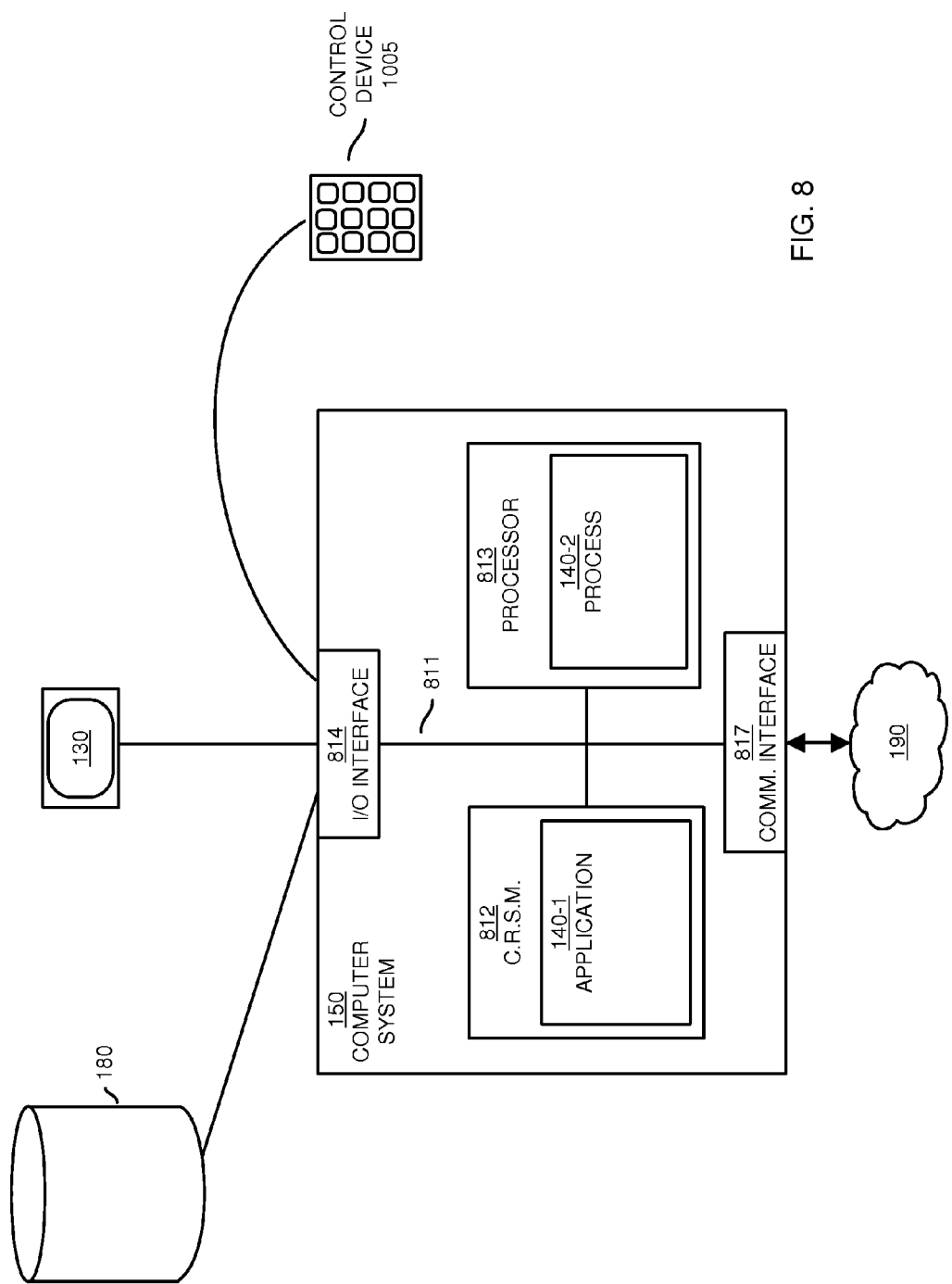
FIG. 8 is a diagram illustrating an example hardware architecture including a processor and an encoded hardware storage medium according to embodiments herein.

FIG. 8 is an example block diagram of a computer system for implementing any of the operations as discussed herein according to embodiments herein.

Computer system 150 can reside in any of the resources as discussed herein such as server resource 140, each of communication devices 160, etc.

As shown, computer system 150 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 180 and, if present, other devices such as a playback device 130, keypad 1005, a computer mouse, etc.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 150 and processor 813 to communicate over a resource such as network 190 to retrieve information from remote sources and communicate with other computers. I/O interface 814 enables processor 813 to retrieve stored information from repository 180.

As shown, computer readable storage media 812 is encoded with application 140-1 (e.g., software, firmware, etc.) executed by processor 813. Application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in application 140-1 stored on computer readable storage medium 812.

Execution of the application 140-1 produces processing functionality such as process 140-2 in processor 813. In other words, the process 140-2 associated with processor 813 represents one or more aspects of executing application 140-1 within or upon the processor 813 in the computer system 150.

Those skilled in the art will understand that the computer system 150 can include other processes and/or software and hardware components, such as an operating system that controls allocation and use of hardware resources to execute application 140-1.

In accordance with different embodiments, note that computer system may be any of various types of devices, including, but not limited to, a set-top box, a television, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 9-12. Note that the steps in the flowcharts below can be executed in any suitable order.

Figure 9:
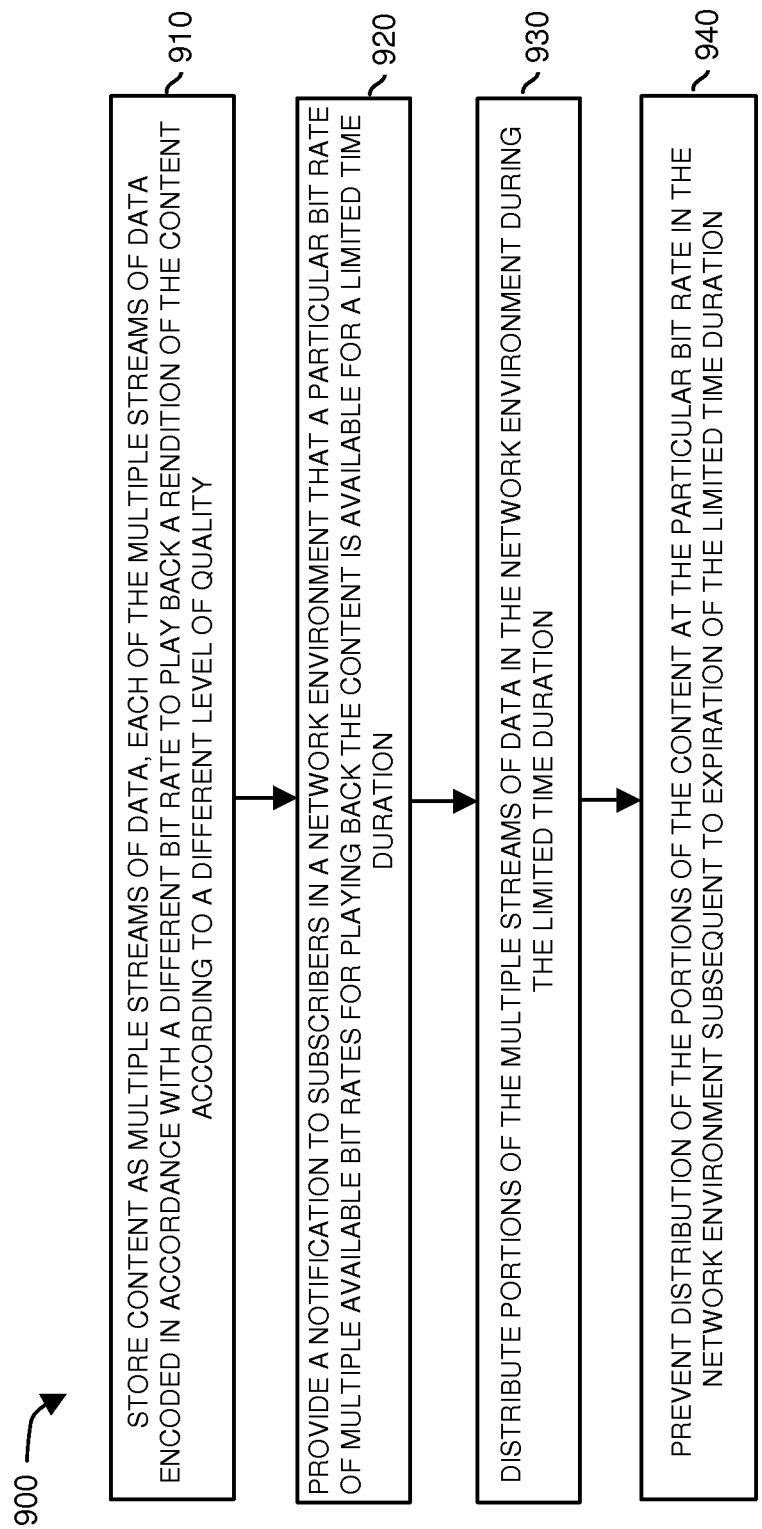
FIGS. 9-12 are flowcharts illustrating example methods according to embodiments herein.

FIG. 9 is a flowchart 900 illustrating an example method of varying the levels of quality of encoded content according to embodiments. Note that there will be some overlap with respect to concepts as discussed above.

In step 910, repository 180 stores content 110 as multiple streams of data 120. In one embodiment, each of the multiple streams of data 120 is encoded in accordance with a different bit rate to play back a rendition of the content 110 according to a different level of quality.

In step 920, the server resource 140 (e.g., one server or multiple disparately located servers) provides a notification to subscribers (e.g., users 108) in network environment 100 that a particular bit rate of multiple available bit rates for playing back the content 110 is available for a limited time duration.

In step 930, the server resource 140 distributes portions of the multiple streams 120 (e.g., segments of encoded content) of data in the network environment 100 during the limited time duration.

Figure 10:
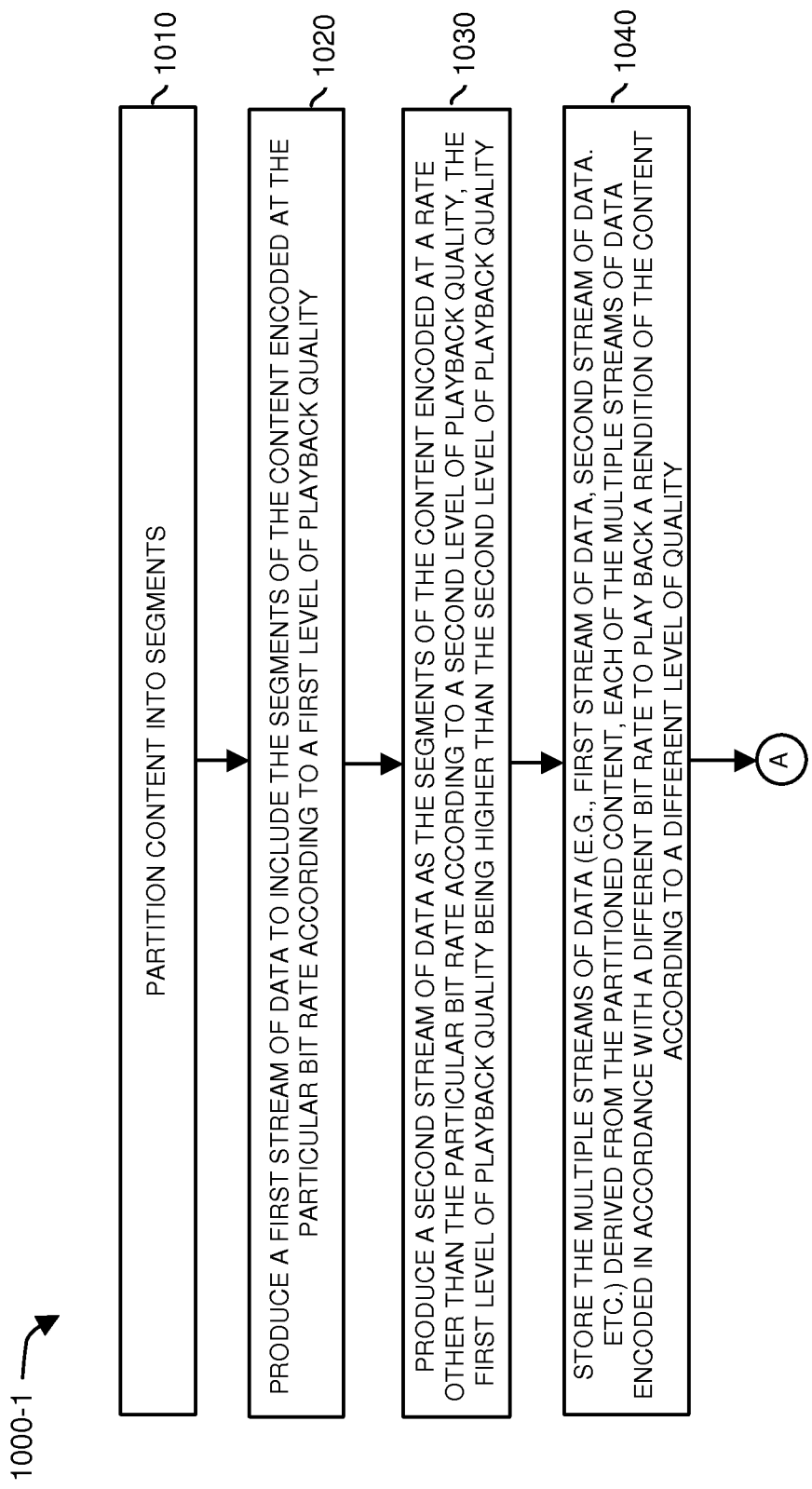
Figure 11:
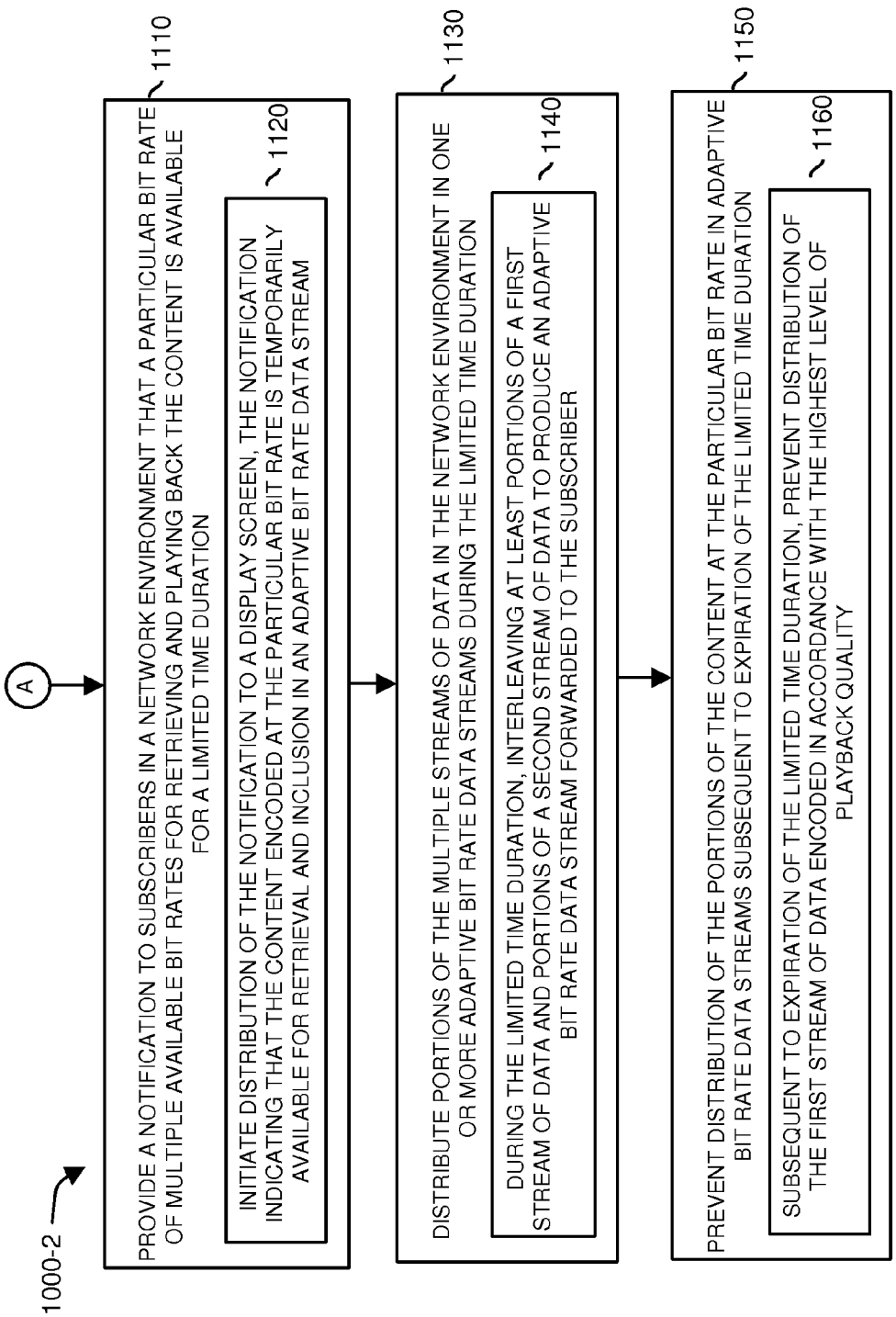

In step 940, the server resource 140 prevents distribution of the portions of the content 110 at the particular bit rate in the network environment 100 subsequent to expiration of the limited time duration FIG. 10 is a flowchart 1000 (e.g., flowchart 1000-1 and flowchart 1000-2) illustrating an example method of varying the levels of quality of encoded content according to embodiments herein. Note that there will be some overlap with respect to concepts as discussed above.

In step 1010, a processing resource partitions content 110 into segments.

In step 1020, the processing resource produces stream of data 120-1 to include the segments of the content 110 encoded at a particular bit rate according to a first level of playback quality.

In step 1030, the processing resource produces stream of data 120-2 as the segments of the content 110 encoded at a rate other than the particular bit rate according to a second level of playback quality; the first level of playback quality is higher than the second level of playback quality.

In step 1040, the repository 180 stores the multiple streams of data (e.g., first stream of data, second stream of data, etc.) derived from the partitioned content; each of the multiple streams of data is encoded in accordance with a different bit rate to play back a rendition of the content according to a different level of quality.

In step 1110, the server resource 140 provides a notification to subscribers (e.g., users 108) in network environment 100 that a particular bit rate of multiple available bit rates for retrieving and playing back the content 110 is available for a limited time duration.

In sub-step 1120, the server resource 140 initiates distribution of the notification (e.g., content schedule information 125, advertisement, etc.) to a display screen viewed by a respective subscriber. The notification indicates that the content 110 encoded at the particular bit rate is temporarily available for retrieval and inclusion in an adaptive bit rate data stream.

In step 1130, the server resource 140 distributes portions (e.g., groupings of data) of the multiple streams of data 120 in the network environment 100 in one or more adaptive bit rate data streams (e.g., data streams 115) during the limited time duration.

In step 1140, during the limited time duration, the server resource 140 interleaves at least portions of a first stream of data 120-1 and portions of a second stream of data 120-2 to produce an adaptive bit rate data stream such as data stream 115-1 forwarded to the subscriber (e.g., user 108-1).

In step 1150, the server resource 140 prevents distribution of the portions of the content 110 at the particular bit rate in adaptive bit rate data streams 115 subsequent to expiration of the limited time duration.

In step 1160, subsequent to expiration of the limited time duration, the server resource 140 prevents distribution of content 110 encoded at a highest level of playback quality.

Figure 12:
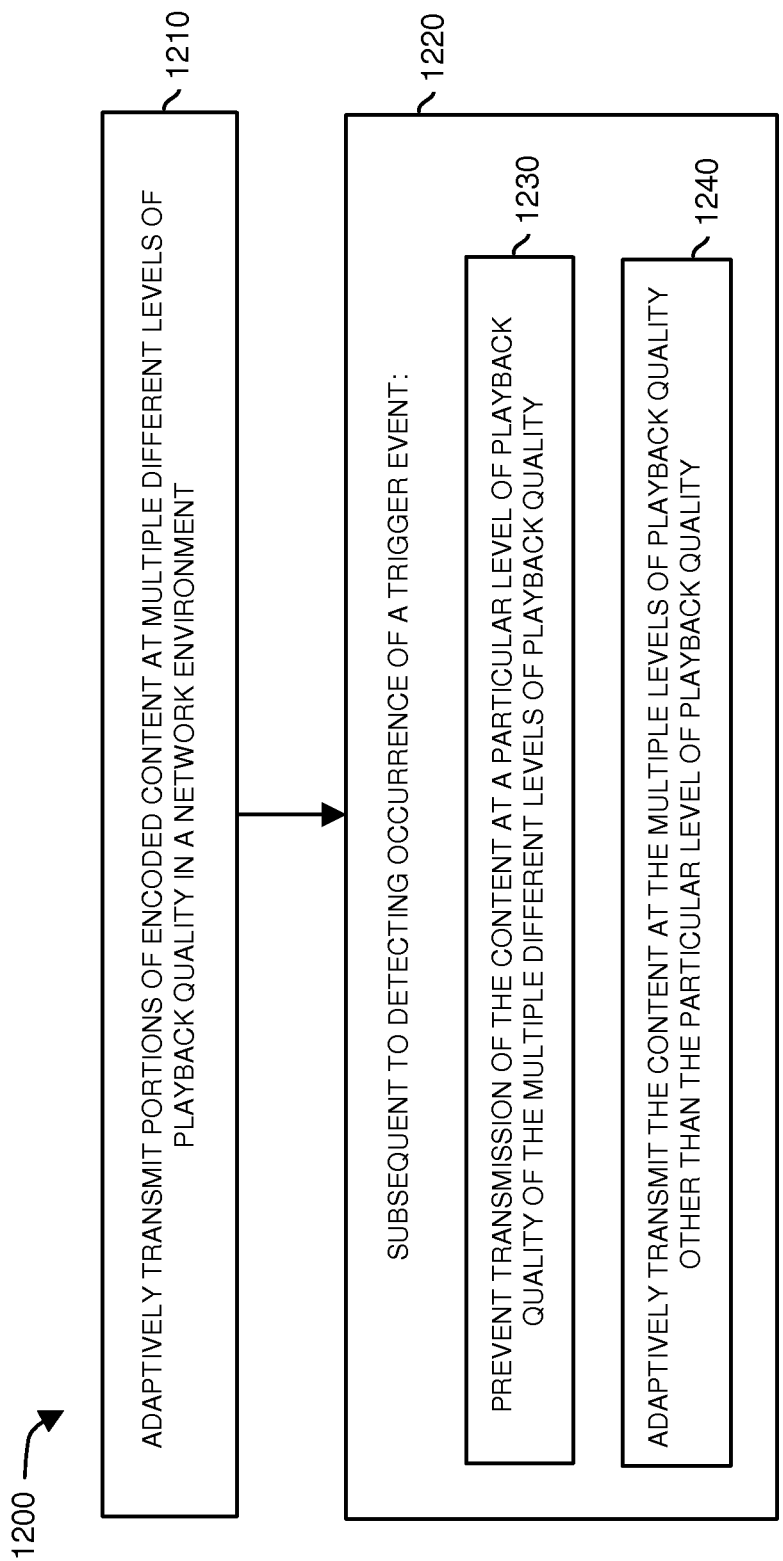

FIG. 12 is a flowchart 1200 illustrating an example method of varying the levels of quality of adaptive bit rate encoded content according to embodiments. Note that there will be some overlap with respect to concepts as discussed above.

In step 1210, the server resource 140 adaptively transmits portions of adaptive bit rate encoded content at multiple different levels of playback quality in a network environment 100.

Subsequent to detecting occurrence of a trigger event: in step 1220, the server resource 140 prevents transmission of the content at a particular level of playback quality of the multiple different levels of playback quality; in step 1230, the server resource 140 adaptively transmits the content at the multiple levels of playback quality other than the particular level of playback quality.

Note again that techniques herein are well suited for distributing content encoded at different levels of quality in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   storing content as multiple streams of data, each of the multiple streams of data encoded in accordance with a different bit rate to play back a rendition of the content according to a different level of quality;
   providing notification to subscribers in a network environment that the content encoded at a particular bit rate of multiple available bit rates for playing back the content is available for a limited time duration;
   distributing portions of the multiple streams of data in the network environment during the limited time duration; and
   preventing distribution of the content encoded at the particular bit rate in the network environment subsequent to expiration of the limited time duration;
   wherein the multiple streams of data includes a first stream of data and a second stream of data, the first stream of data encoded in accordance with the particular bit rate, the second stream of data encoded in accordance with a bit rate lower than the particular bit rate;
   wherein distributing the multiple streams of data includes:
      during the limited time duration, interleaving at least portions of the first stream of data and portions of the second stream of data to produce an adaptive bit rate data stream forwarded to at least one subscriber in the network environment; and
      subsequent to the limited time duration, preventing distribution of portions of the first stream of data in respective adaptive bit rate data streams to the subscribers.

2. The method as in claim 1, wherein each of the multiple streams of data represents a version of same content at a different level of quality; and
   wherein providing the notification includes: notifying the subscribers in the network environment that the particular bit rate corresponds to a stream of data encoded in accordance with a highest level of quality amongst the multiple streams of data.

3. The method as in claim 2, wherein providing the notification includes distributing content access information indicating that the content encoded as streams of data encoded at a lower bit rate than the particular bit rate are available after the limited time duration; and
   wherein the limited time duration expires at a pre-scheduled date and time.

4. The method as in claim 2, wherein the limited time duration expires in response to detecting that a threshold number of subscribers retrieves the stream of data encoded in accordance with the highest level of quality.

5. The method as in claim 1, wherein distributing the multiple streams of data in the network environment includes:
   prior to expiration of the limited time duration, switching between transmitting portions of the first stream of the multiple streams of data and transmitting portions of the second stream of data of the multiple streams of data to a given subscriber in the network environment, the first stream of data encoded in accordance with the particular bit rate and providing a highest level of playback quality amongst the multiple streams of data, the second stream of data encoded in accordance with a level of playback quality lower than the highest level of playback quality.

6. The method as in claim 5, wherein distributing the multiple streams of data in the network environment includes:
   subsequent to expiration of the limited time duration: i) preventing distribution of the first stream of data encoded in accordance with the highest level of playback quality, and ii) providing continued access to the second stream of data.

7. The method as in claim 1, wherein distributing the multiple streams of data in the network environment includes:

from a first network address, distributing portions of the content in the network environment as the first stream of data encoded in accordance with a first level of playback quality;

from a second network address, distributing portions of the content in the network environment as the second stream of data encoded in accordance with a second level of playback quality, the second level of quality higher than the first level of playback quality; and from a third network address, distributing portions of the content in the network environment as a third stream of data encoded in accordance with a third level of playback quality, the third level of quality higher than the second level of playback quality.

8. The method as in claim 1, wherein providing the notification includes:

providing notification to the subscribers in the network environment that the content is retrievable at the particular bit rate in an adaptive bit-rate data stream during the limited time duration, the notification further indicating that the content encoded at the particular bit rate is not available after the limited time duration.

9. The method as in claim 1, wherein providing the notification includes:

initiating display of the notification on a display screen, the notification indicating that a version of the content encoded at the particular bit rate is temporarily available for retrieval and inclusion in an adaptive bit rate data stream during the limited time duration, the notification further indicating that a version of the content encoded at a lower bit rate than the particular bit rate is available for retrieval after the limited time duration.

10. The method as in claim 1 further comprising:

producing first content access information, the first content access information indicating portions of the content that are available for retrieval at the particular bit rate and other bit rates during the limited time duration;

distributing the first content access information to the subscribers in the network environment;

producing second content access information, the second content access information indicating portions of the content that are available for retrieval at the bit rates other than the particular bit rate after the limited time duration; and distributing the second content access information to the subscribers in the network environment.

11. The method as in claim 1 further comprising:

in the adaptive bit rate data stream, inserting a network address indicating a resource from which to retrieve the content encoded at the particular bit rate.

12. The method as in claim 1 further comprising:

providing the notification in content guide information viewed by subscribers in the network environment prior to distributing the content encoded at the particular bit rate.

13. A method comprising:

during a period of promoting distribution of content: adaptively transmitting portions of the content encoded at multiple different levels of playback quality in a network environment; and subsequent to a trigger event in which the period of promoting the distribution of content has ended:

preventing transmission of the content at a particular level of playback quality of the multiple different levels of playback quality, and adaptively transmitting the content encoded at the multiple levels of playback quality other than at the particular level of playback quality;

wherein the particular level of playback quality is a first level of playback quality;

wherein the multiple levels of playback quality includes at least the first level of playback quality, a second level of playback quality, and a third level of playback quality;

the method further comprising:

during the period: selecting from the multiple levels of playback quality of encoded content to adaptively transmit a first logical stream of data including portions of the content encoded at the first level of playback quality and portions of the content encoded at the second level of playback quality; and after expiration of the period: i) providing access to a limited set of the multiple level of playback quality available for retrieval, the limited set including the second level of playback quality and the third level of playback quality, the limited set excluding the first level of playback quality, ii) selecting from the limited set of multiple levels of playback quality of encoded content to adaptively transmit a second logical stream of data including portions of the content encoded at the second level playback quality and portions of the content encoded at the third level of playback quality.

14. The method as in claim 13, wherein the particular level of playback quality is the highest level of playback quality amongst the multiple levels of playback quality, the highest level of playback quality temporarily available for retrieval in an adaptive bit rate data stream during the period as part of a promotion.

15. The method as in claim 13, wherein detecting occurrence of the trigger event includes: detecting switchover from a first distribution mode to a second distribution mode, the first distribution mode distributing the content at the multiple different levels of playback quality including the particular level of playback quality, the second distribution mode distributing the content in accordance with multiple levels of playback quality other than at the particular level of playback quality.

16. The method as in claim 13, wherein adaptively transmitting portions of content encoded at multiple different levels of playback quality in the network environment includes producing a first adaptive bit rate data stream including at least portions of the content encoded at the particular level of playback quality; and wherein adaptively transmitting portions of the content encoded at the multiple levels of playback quality other than the particular level of playback quality includes preventing inclusion of portions of the content encoded at the particular level of playback quality in a second adaptive bit rate data stream transmitted in the network environment.

17. The method as in claim 13 further comprising:

receiving a selection to view playback of an adaptive bit rate data stream of the content without advertisements; and in response to the selection, initiating transmission of the content at the multiple different bit rates in the adaptive bit rate data stream without the advertisements.

18. The method as in claim 13 further comprising:

storing a first stream of data to include segments of the content encoded according to the first level of playback quality;

storing a second stream of data to include the segments of the content encoded according to a second level of playback quality, the first level of playback quality being higher than the second level of playback quality; and wherein adaptively transmitting portions of the content includes producing an adaptive bit rate data stream to include content encoded according to the first level of playback quality and the second level of playback quality.

19. The method as in claim 18 further comprising:

in the adaptive bit rate data stream, inserting a network address indicating a resource from which to retrieve segments of the content encoded according to the first level of playback quality.

20. The method as in claim 13, wherein the particular level of playback quality is a first level of playback quality;

wherein the multiple levels of playback quality includes at least the first level of playback quality, a second level of playback quality, and a third level of playback quality.

21. The method as in claim 13, wherein the content is a stream of content including a sequence of logical segments;

wherein the first level of playback quality includes the logical segments encoded in accordance with a first encoding bit rate;

wherein the second level of playback quality includes the logical segments encoded in accordance with a second encoding bit rate; and wherein the third level of playback quality includes the logical segments encoded in accordance with a third encoding bit rate.

22. A computer system comprising:

at least one processor device; and a hardware storage resource coupled to the at least one processor device, the hardware storage resource storing instructions that, when executed by the at least one processor device, cause the at least one processor device to perform the operations of:

storing content as multiple streams of data, each of the multiple streams of data encoded in accordance with a different bit rate to play back a rendition of the content according to a different level of quality;

providing notification to subscribers in a network environment that the content encoded at a particular bit rate of multiple available bit rates for playing back the content is available for a limited time duration;

distributing portions of the multiple streams of data in the network environment during the limited time duration; and while continuing to provide access to a less-than-all subset of the content encoded at the multiple available bit rates, preventing distribution of the content encoded at the particular bit rate in the network environment subsequent to expiration of the limited time duration;

wherein the at least one processor device further supports operations of:

producing first content access information, the first content access information indicating portions of the content that are available for retrieval at the particular bit rate and other bit rates during the limited time duration;

distributing the first content access information to the subscribers in the network environment;

producing second content access information, the second content access information indicating portions of the content that are available for retrieval at the bit rates other than the particular bit rate after the limited time duration; and distributing the second content access information to the subscribers in the network environment.

23. The computer system as in claim 22, wherein providing the notification includes:

notifying the subscribers in the network environment that the particular bit rate corresponds to a stream of data encoded in accordance with a highest level of quality amongst the multiple streams of data.

24. The computer system as in claim 22, wherein the limited time duration expires at a pre-scheduled date and time.

25. The computer system as in claim 22, wherein the limited time duration expires in response to detecting that a threshold number of subscribers retrieves the stream of data encoded in accordance with the highest level of quality.

26. The computer system as in claim 22, wherein distributing the multiple streams of data in the network environment includes:

prior to expiration of the limited time duration, switching between transmitting portions of a first stream of the multiple streams of data and transmitting portions of a second stream of data of the multiple streams of data to a given subscriber in the network environment, the first stream of data encoded in accordance with the particular bit rate and providing a highest level of playback quality amongst the multiple streams of data, the second stream of data encoded in accordance with a level of playback quality lower than the highest level of playback quality.

27. The computer system as in claim 26, wherein distributing the multiple streams of data in the network environment includes:

subsequent to expiration of the limited time duration, preventing distribution of the first stream of data encoded in accordance with the highest level of playback quality.

28. The computer system as in claim 22, wherein distributing the multiple streams of data in the network environment includes:

from a first network address, distributing portions of the content in the network environment as a first stream of data encoded in accordance with a first level of playback quality;

from a second network address, distributing portions of the content in the network environment as a second stream of data encoded in accordance with a second level of playback quality, the second level of quality higher than the first level of playback quality; and from a third network address, distributing portions of the content in the network environment as a third stream of data encoded in accordance with a third level of playback quality, the third level of quality higher than the second level of playback quality.

29. The computer system as in claim 22, wherein providing the notification includes:

providing notification to the subscribers in the network environment that the content is retrievable at the particular bit rate in an adaptive bit-rate data stream during the limited time duration.

30. The computer system as in claim 22, wherein the multiple streams of data includes a first stream of data and a second stream of data, the first stream of data encoded in accordance with the particular bit rate, the second stream of data encoded in accordance with a bit rate lower than the particular bit rate; and wherein distributing the multiple streams of data includes:

during the limited time duration, interleaving at least portions of the first stream of data and portions of the second stream of data to produce an adaptive bit rate data stream forwarded to at least one subscriber in the network environment; and subsequent to the limited time duration, preventing distribution of portions of the first stream of data in respective adaptive bit rate data streams to the subscribers.

31. The computer system as in claim 30, wherein the at least one processor device further supports operations of:

in the adaptive bit rate data stream, inserting a network address indicating a resource from which to retrieve the content encoded at the particular bit rate.

32. The computer system as in claim 22, wherein providing the notification includes:

initiating display of the notification on a display screen, the notification indicating that the content encoded at the particular bit rate is temporarily available for retrieval and inclusion in an adaptive bit rate data stream.

33. A method comprising:

storing content as multiple streams of data, each of the multiple streams of data encoded in accordance with a different bit rate to play back a rendition of the content according to a different level of quality;

providing notification to subscribers in a network environment that the content encoded at a particular bit rate of multiple available bit rates for playing back the content is available for a limited time duration;

distributing portions of the multiple streams of data in the network environment during the limited time duration;

preventing distribution of the content encoded at the particular bit rate in the network environment subsequent to expiration of the limited time duration; and providing the notification in a content guide prior to the distributing, the content guide indicating to subscribers in the network environment that the content is available after the limited time duration but that the content encoded at the particular bit rate is not available after the limited time duration.

34. The method as in claim 33, wherein each of the multiple streams of data represents a version of same content at a different level of quality; and wherein providing the notification includes: notifying the subscribers in the network environment that the particular bit rate corresponds to a stream of data encoded in accordance with a highest level of quality amongst the multiple streams of data.

35. The method as in claim 34, wherein providing the notification includes distributing content access information indicating that the content encoded as streams of data encoded at a lower bit rate than the particular bit rate are available after the limited time duration; and wherein the limited time duration expires at a pre-scheduled date and time.

36. The method as in claim 34, wherein the limited time duration expires in response to detecting that a threshold number of subscribers retrieves the stream of data encoded in accordance with the highest level of quality.

37. The method as in claim 33, wherein distributing the multiple streams of data in the network environment includes:

prior to expiration of the limited time duration, switching between transmitting portions of a first stream of the multiple streams of data and transmitting portions of a second stream of data of the multiple streams of data to a given subscriber in the network environment, the first stream of data encoded in accordance with the particular bit rate and providing a highest level of playback quality amongst the multiple streams of data, the second stream of data encoded in accordance with a level of playback quality lower than the highest level of playback quality.

38. The method as in claim 33, wherein providing the notification includes:

initiating display of the notification on a display screen, the notification indicating that a version of the content encoded at the particular bit rate is temporarily available for retrieval and inclusion in an adaptive bit rate data stream during the limited time duration, the notification further indicating that a version of the content encoded at a lower bit rate than the particular bit rate is available for retrieval after the limited time duration.

39. The method as in claim 33 further comprising:

producing first content access information, the first content access information indicating portions of the content that are available for retrieval at the particular bit rate and other bit rates during the limited time duration;

distributing the first content access information to the subscribers in the network environment;

producing second content access information, the second content access information indicating portions of the content that are available for retrieval at the bit rates other than the particular bit rate after the limited time duration; and distributing the second content access information to the subscribers in the network environment.

40. A method comprising:

storing content as multiple streams of data, each of the multiple streams of data encoded in accordance with a different bit rate to play back a rendition of the content according to a different level of quality;

providing notification to subscribers in a network environment that the content encoded at a particular bit rate of multiple available bit rates for playing back the content is available for a limited time duration;

distributing portions of the multiple streams of data in the network environment during the limited time duration; and preventing distribution of the content encoded at the particular bit rate in the network environment subsequent to expiration of the limited time duration;

wherein the multiple streams of data includes a first stream of data and a second stream of data, the first stream of data encoded in accordance with the particular bit rate, the second stream of data encoded in accordance with a bit rate lower than the particular bit rate; and wherein distributing the multiple streams of data includes:

during the limited time duration, providing subscribers in the network environment access to segments in the first stream of data and segments in the second stream of data; and subsequent to the limited time duration: i) preventing distribution of the segments of the first stream of data to the subscribers, and ii) providing the subscribers in the network environment access to segments in the second stream of data.

41. The method as in claim 40, wherein the first stream of data supports playback of a version of the content encoded at a first level of playback quality; and wherein the second stream of data supports playback of a version of the content encoded at a second level of playback quality.

42. The method as in claim 40, wherein each of the multiple streams of data represents a version of same content at a different level of quality; and wherein providing the notification includes: notifying the subscribers in the network environment that the particular bit rate corresponds to a stream of data encoded in accordance with a highest level of quality amongst the multiple streams of data.

43. The method as in claim 42, wherein providing the notification includes distributing content access information indicating that the content encoded as streams of data encoded at a lower bit rate than the particular bit rate are available after the limited time duration; and wherein the limited time duration expires at a pre-scheduled date and time.

44. The method as in claim 42, wherein the limited time duration expires in response to detecting that a threshold number of subscribers retrieves the stream of data encoded in accordance with the highest level of quality.

45. The method as in claim 40, wherein providing the notification includes:

initiating display of the notification on a display screen, the notification indicating that a version of the content encoded at the particular bit rate is temporarily available for retrieval and inclusion in an adaptive bit rate data stream during the limited time duration, the notification further indicating that a version of the content encoded at a lower bit rate than the particular bit rate is available for retrieval after the limited time duration.

46. The method as in claim 40 further comprising:

producing first content access information, the first content access information indicating portions of the content that are available for retrieval at the particular bit rate and other bit rates during the limited time duration;

distributing the first content access information to the subscribers in the network environment;

producing second content access information, the second content access information indicating portions of the content that are available for retrieval at the bit rates other than the particular bit rate after the limited time duration; and distributing the second content access information to the subscribers in the network environment.

* * * * *